US010682933B2

(12) United States Patent
Bischoff (10) Patent No.: US 10,682,933 B2
(45) Date of Patent: Jun. 16, 2020

(54) ADJUSTABLE SEAT SUSPENSION ASSEMBLY (71) Applicant: Eric Bischoff, New York, NY (US)

(72) Inventor: Eric Bischoff, New York, NY (US)

(73) Assignee: Eric Bischoff, New York, NY (US)

(*) Notice: Subject to any disclaimer, the term of this patent is extended or adjusted under 35 U.S.C. 154(b) by 59 days.

(21) Appl. No.: 15/981,550

(22) Filed: May 16, 2018

(65) Prior Publication Data
US 2019/0351795 A1 Nov. 21, 2019

(51) Int. Cl.
B60N 2/50 (2006.01)
B60N 2/54 (2006.01)
B63B 29/06 (2006.01)
B60N 2/16 (2006.01)
B63B 29/04 (2006.01)

(52) U.S. Cl.
CPC ............... B60N 2/505 (2013.01); B60N 2/16 (2013.01); B60N 2/504 (2013.01); B60N 2/506 (2013.01); B60N 2/509 (2013.01); B60N 2/544 (2013.01); B63B 29/06 (2013.01); B63B 2029/043 (2013.01)

(58) Field of Classification Search
CPC .......... B60N 2/505; B60N 2/16; B60N 2/504; B60N 2/506; B60N 2/509; B60N 2/544; B60N 2/502; B60N 2/503; B60N 2/54; B63B 2029/043; A47C 7/441
See application file for complete search history.

(56) References Cited

U.S. PATENT DOCUMENTS

| 1,093,741 | A |   | 4/1914  | Stoll           |           |
|-----------|---|---|---------|-----------------|-----------|
| 1,127,413 | A |   | 2/1915  | Davis           |           |
| 1,400,974 | A |   | 12/1921 | Parker          |           |
| 1,774,555 | A |   | 9/1930  | Horsley et al.  |           |
| 2,298,230 | A |   | 10/1942 | Radke           |           |
| 2,331,990 | A |   | 10/1943 | McArthur        |           |
| 2,637,368 | A |   | 5/1953  | Cotton          |           |
| 2,685,324 | A | * | 8/1954  | Kramer          | B60N 2/504 |
|           |   |   |         |                 | 248/575   |
| 2,787,315 | A |   | 4/1957  | Siebert         |           |
| 2,828,801 | A |   | 4/1958  | Papst           |           |
| 2,892,482 | A |   | 6/1959  | Beoletto        |           |
| 2,893,470 | A |   | 7/1959  | Peller          |           |

(Continued)

OTHER PUBLICATIONS

Glide Ryde Marine Suspension Seating, product literature and pictures of device, undated.

(Continued)

Primary Examiner — Christopher Garft
(74) Attorney, Agent, or Firm — Hoffmann & Baron, LLP (57) ABSTRACT A seat suspension includes a frame fixedly securable to a structure. A suspension assembly is operably connected to the frame. A seat support is adapted to receive a seat, and the seat support is operably connected to the suspension assembly. The suspension assembly includes a first elongate suspension bar slidably disposed on a pivot surface. The first suspension bar has a first end slidingly secured to the seat support and a second opposed end secured to a shock compensating device. The suspension bar is translatable relative to the pivot surface, wherein moving the suspension bar changes the shock compensation of the suspension assembly.

20 Claims, 6 Drawing Sheets

(56) References Cited

U.S. PATENT DOCUMENTS

| | | | |
|---|---|---|---|
| 3,163,409 A | 12/1964 | Running et al. | |
| 3,186,674 A | 6/1965 | O'Link | |
| 3,325,136 A | 6/1967 | Radke et al. | |
| 3,339,906 A * | 9/1967 | Gote | B60N 2/045 267/131 |
| 3,593,953 A * | 7/1971 | Auer | B60N 2/501 296/63 |
| 3,601,351 A | 8/1971 | Ambrosius | |
| 3,823,932 A | 7/1974 | Simons | |
| 3,861,637 A * | 1/1975 | DeLongchamp | B60N 2/504 248/576 |
| 4,047,759 A | 9/1977 | Koscinski | |
| 4,128,217 A | 12/1978 | Mazelsky | |
| 4,186,963 A * | 2/1980 | Koutsky | B60N 2/503 248/576 |
| 4,198,092 A | 4/1980 | Federspiel | |
| 4,401,342 A | 8/1983 | Andersson | |
| 4,662,597 A * | 5/1987 | Uecker | B60N 2/504 248/419 |
| 4,678,155 A * | 7/1987 | Carter | B60N 2/502 248/564 |
| 4,709,649 A | 12/1987 | Wann | |
| 4,809,944 A | 3/1989 | Smith et al. | |
| 4,856,763 A | 8/1989 | Brodersen | |
| 4,883,249 A | 11/1989 | Garland | |
| 4,943,037 A | 7/1990 | Brodersen | |
| 4,977,848 A | 12/1990 | Currey | |
| 5,029,888 A | 7/1991 | Allsop | |
| 5,044,299 A | 9/1991 | Frank | |
| 5,044,587 A | 9/1991 | Degen | |
| 5,080,318 A | 1/1992 | Takamatsu | |
| 5,125,631 A | 6/1992 | Brodersen | |
| 5,154,402 A | 10/1992 | Hill | |
| 5,169,112 A | 12/1992 | Boyles et al. | |
| 5,176,355 A | 1/1993 | Carter | |
| 5,222,709 A | 6/1993 | Culley | |
| 5,234,203 A | 8/1993 | Smith | |
| 5,273,260 A | 12/1993 | Nagata | |
| 5,294,085 A | 3/1994 | Lloyd et al. | |
| 5,309,861 A | 5/1994 | Mardikian | |
| 5,324,095 A * | 6/1994 | Yamauchi | B60N 2/504 297/216.16 |
| 5,367,978 A | 11/1994 | Mardikian | |
| 5,382,038 A | 1/1995 | Allsop | |
| 5,395,089 A * | 3/1995 | Yamauchi | B60N 2/504 248/578 |
| 5,451,094 A | 9/1995 | Templin et al. | |
| 5,542,371 A | 8/1996 | Harvey et al. | |
| 5,642,916 A | 7/1997 | Dybro et al. | |
| 5,676,336 A | 10/1997 | Nefy et al. | |
| 5,735,509 A | 4/1998 | Gryp et al. | |
| 5,758,859 A | 6/1998 | Gonzalez | |
| 6,237,889 B1 | 5/2001 | Bischoff | |
| 6,257,663 B1 | 7/2001 | Swierczewski | |
| 8,047,596 B2 | 11/2011 | Jungert | |
| 8,186,737 B2 | 5/2012 | Jungert | |
| 8,684,339 B2 | 4/2014 | Deml | |
| 8,690,114 B2 | 4/2014 | Boyarski | |
| 9,016,787 B2 | 4/2015 | Romer | |
| 2011/0024958 A1 | 2/2011 | Deml et al. | |

OTHER PUBLICATIONS

Industrial Seating Inc. product sheet, Model #4805S, undated.
Mariner Suspension Seats Brochure, Seats Incorporated, Reedsburg, Wisconsin, 1990.
H.O. Bostrom Seaport™ Series Brochure, H.O. Bostrom Company, Inc., Waukesha, Wisconsin, undated.
Wave Impact Seating Systems, Grand Products Company, product literature, undated.
SeaspensionTM, Land-Mar Products, Inc., product literature, undated.
Garelick Active Seat Suspension Unit, product literature, 1999.
Marine Seats—Suspension, Bentley's Manufacturing Inc., product literature, 1999.
Attwood Avenir Bucket Seat with Flip Up Bolster, Bart's Water Sports, product literature, undated.

* cited by examiner

ADJUSTABLE SEAT SUSPENSION ASSEMBLY

FIELD TECHNOLOGY

The present disclosure relates to a seat suspension assembly having shock absorbing capabilities for accommodating shock waves imparted thereto. More particularly, the present invention relates to an adjustable seat suspension assembly for use in watercraft or land vehicles having an adjustable shock accommodating and dissipating capability for isolating an occupant of the seat from shock waves imparted on the watercraft or vehicle.

BACKGROUND

It is well known that occupants of watercrafts, especially small boats, may experience a jarring and unsettling ride as the boat moves through the water. As the waves impact the hull of the boat, the shock waves are almost directly transferred to the occupant. Such shock waves can seriously diminish the enjoyment and comfort of the boat passengers. In extreme cases, the harshness of the ride may lead to spinal injuries or at the very least aggravate preexisting spinal conditions. The discomfort is especially prevalent if the boat is relatively small and is moving fast through choppy water.

The harshness of the ride is often only slightly mitigated by the typical boat seat. Standard boat seats are rigidly secured to the deck of the boat and include a cushion material which provides only a minimal amount of shock accommodation and dissipation. Therefore, an occupant sitting in a typical boat seat is subjected to some discomfort as the boat travels through the water. Such discomfort is especially troublesome if the occupant is suffering from a sore back or neck and may lead to individuals refraining from engaging in watercraft associated activities. In addition to the discomfort resulting from the motion of the boat as it travels through the water, the driver of the boat may find it difficult to maintain control since they are being tossed about. Such a jarring ride makes it difficult to hold the steering device steady and to maintain control over the throttle.

The experience of being tossed about in one's seat can also be experienced by those riding in land vehicles, especially off-road passenger vehicles and/or construction vehicles. Even though such vehicles include suspension systems which are designed to somewhat isolate the occupants from the irregularities in the roadway, the suspension systems are limited in their capacity to do that and the passengers still can receive significant shock or vibrations especially if the vehicle is moving rapidly over rough terrain.

Attempts have been made in the prior art in order to accommodate shock waves imparted to boats or land vehicles. One such attempt is disclosed in U.S. Pat. No. 5,044,299 to Frank. Frank discloses a seat construction for a boat that comprises a support sleeve arranged for mounting on a boat with a longitudinal axis vertical to the boat. An elongate seat support element is slidable longitudinally of the sleeve and is configured and is confined by an upper bearing element of the sleeve and a lower bearing element of the sleeve. A spring is retained within the sleeve and adapted to permit the seat support element to extend therein. The seat support element is permitted to move under bias of the spring in a vertical direction. Therefore, the seat construction provides flexibility to the seat in order to accommodate vertical shock. However, the Frank device does not provide a mechanism for the seat occupant to adjust the characteristics to accommodate shock. Furthermore, there is no separate shock-dampening device; therefore, the occupant may end up bouncing up and down with the seat in an exaggerated manner in response to a shock wave hitting the boat.

U.S. Pat. No. 2,893,470 to Peller discloses an adjustable seat with shock adsorbing capabilities. The seat includes a pair of telescoping cylinders which contain a coil spring surrounding a hydraulic shock absorber. The height of the seat can be adjusted by rotation of a handle which, through a series of gears, adjusts the distance between the bottom of the shock absorber and the bottom of the surface to which the seat is mounted. This design does not give the seat occupant the ability to adjust the shock dampening characteristics of the suspension.

Use of telescoping cylinders with a spring and shock absorbing apparatus formed therein is also disclosed in U.S. Pat. No. 1,400,974 to Parker. This design discloses the use of two pedestals formed underneath the seating surface.

Accordingly, it would be desirable to provide a seat and suspension system having a suspension system absorbing vibrations and impacts imparted thereto.

SUMMARY

It is an advantage of the present disclosure to provide a seat suspension assembly for isolating an occupant of the seat from shocks imparted to the assembly.

It is another advantage of the present disclosure to provide an adjustable seat suspension assembly for adjusting the shock absorbing capabilities of the assembly.

It is yet another advantage of the present disclosure to provide a seat suspension assembly wherein the height of the seat is adjustable.

In the efficient attainment of these and other advantages, the present disclosure provides a seat suspension including a frame fixedly securable to a structure. A suspension assembly is operably connected to the frame. A seat support is adapted to receive a seat, and the seat support is operably connected to the suspension assembly. The suspension assembly includes a first elongate suspension bar slidably disposed on a pivot surface. The first suspension bar has a first end slidingly secured to the seat support and a second opposed end secured to a shock compensating device. The suspension bar is translatable relative to the pivot surface, wherein moving the suspension bar changes the shock compensation of the suspension assembly.

The present disclosure also provides a seat suspension including a frame fixedly securable to a structure. The frame including a back portion and a bottom portion. The bottom portion is securable to a support surface. A suspension assembly is operably connected to the frame. The suspension assembly being adjustable to change the shock compensation of the suspension assembly. A seat support is adapted to receive a seat. The seat support is operably connected to the suspension assembly. The movement characteristics of the seat support are responsive to an adjustment of the suspension assembly. A height adjustment mechanism is disposed on the frame, and the height adjustment mechanism includes an actuator. Operation of the actuator selectively moves the seat support and the suspension assembly up and down relative to the frame.

DETAILED DESCRIPTION

Figure 1:
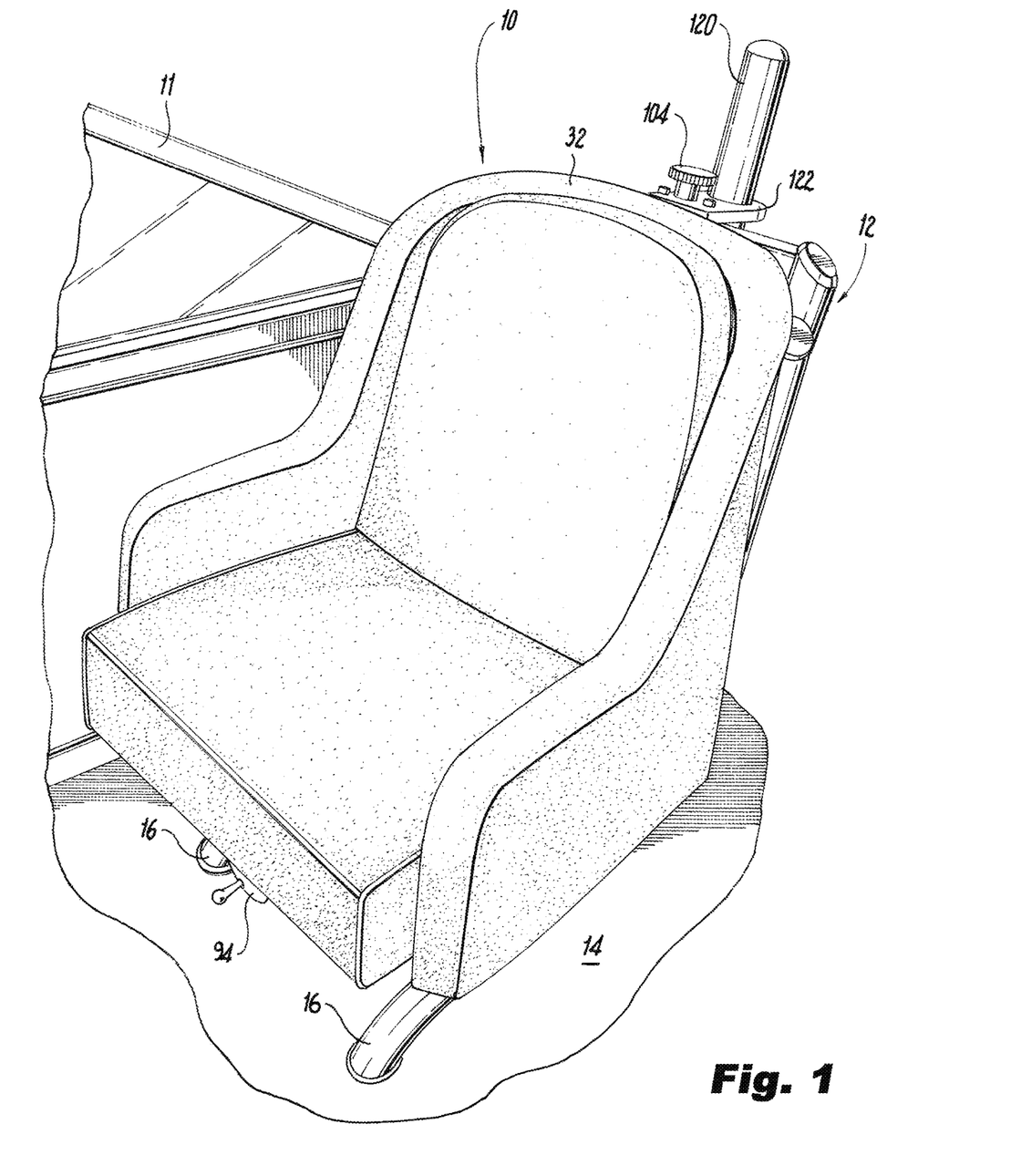
FIG. 1 is top perspective view of the seat suspension assembly of the present invention.
Figure 2:
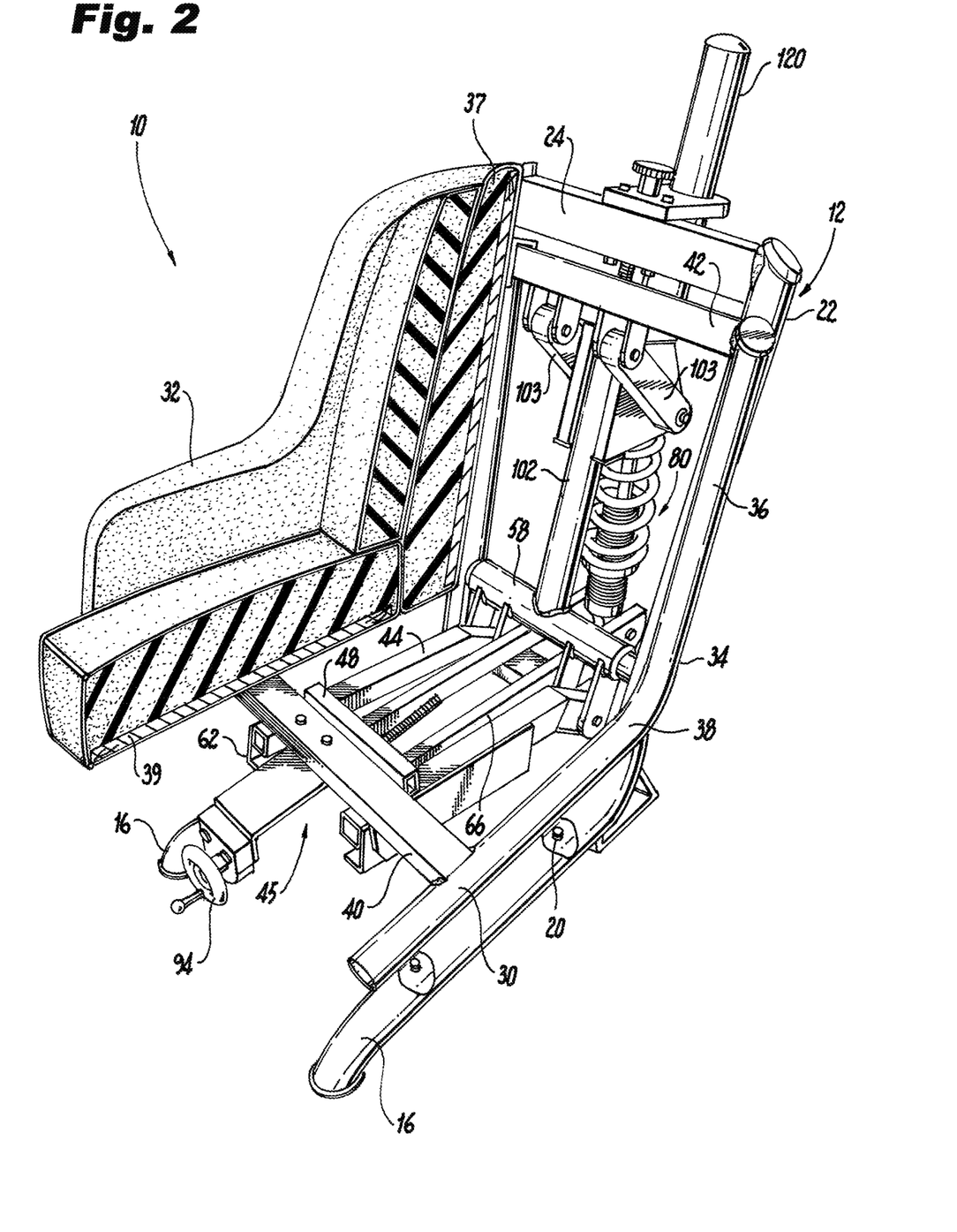
FIG. 2 is top perspective view of the seat suspension assembly of FIG. 1 with a portion of the seat removed.

With reference to FIGS. 1 and 2, the seat suspension assembly 10 of the present disclosure provides the ability to absorb impacts imparted to a watercraft or air or land vehicle, thereby substantially isolating the occupant of the seat from jarring shocks caused by such impacts. The seat suspension assembly 10 may be used in a variety of applications, including boats, which are subjected to significant wave impacts as they travel through water, and land vehicles when driven on rough surfaces. Boats typically have a rigid hull construction and any impact imparted on the hull is transferred directly to a seat and its occupant. Even watercraft having inflatable hulls have operational hull pressures which form a fairly rigid hull resulting in a jarring ride for the occupants. The seat suspension assembly 10 provides the ability to reduce the effects for the impacts by dampening the shock impulses and isolating the occupant of the seat from the craft. This reduces the likelihood of injury and allows for a more comfortable and pleasant ride. In addition, seat suspension assembly 10 permits an occupant who is driving the boat to remain relatively unjarred which increases the ability to properly control the steering wheel and throttle.

While the seat assembly 10 is particularly useful in watercraft 11, it is within the contemplation of the present invention that the seat suspension assembly may also be employed in other modes of transportation including land vehicles, such as sport utility vehicles and off-road construction equipment. Such vehicles also typically encounter significant shocks and impacts which are transmitted to the vehicle's occupants.

Figure 5:
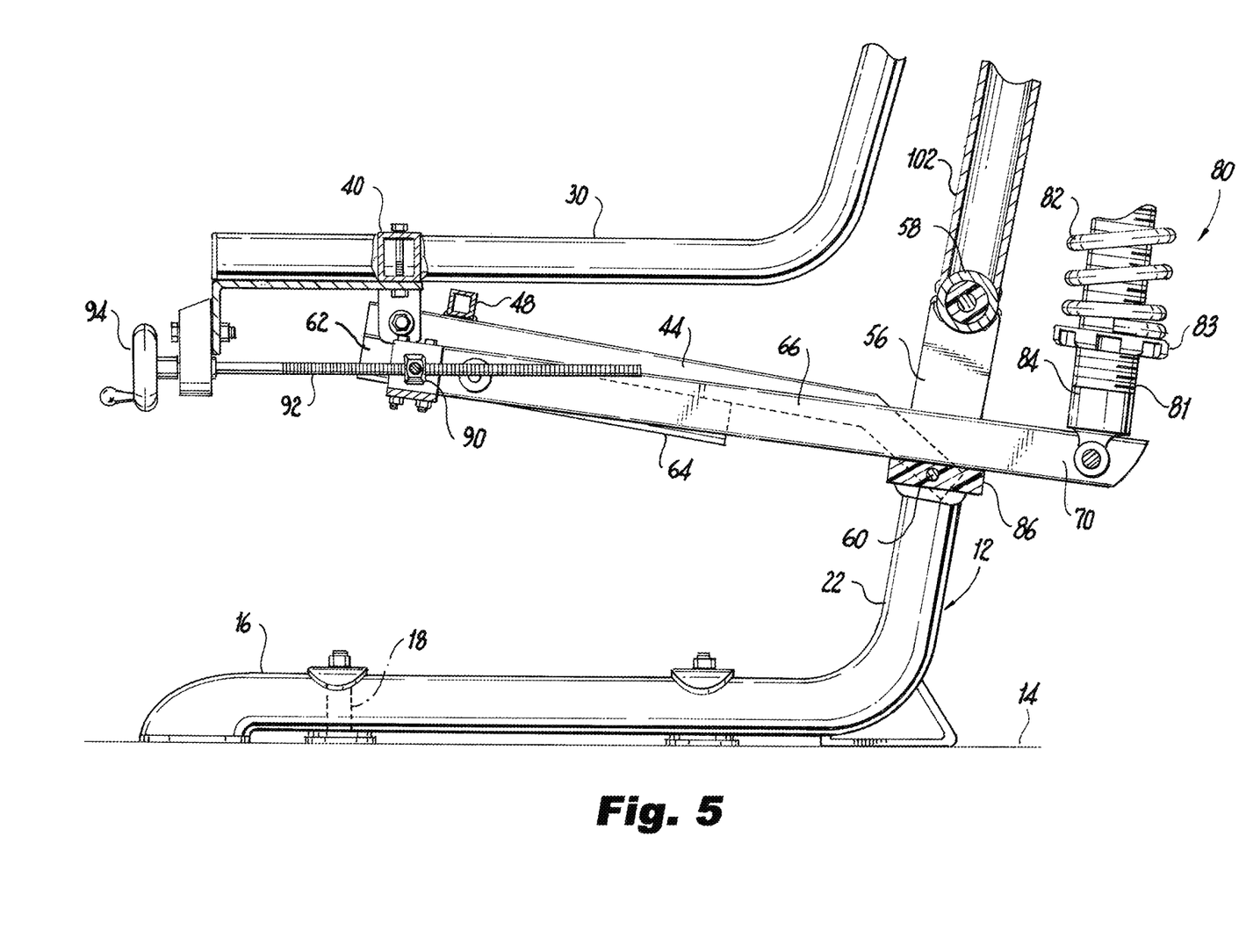
FIG. 5 is a side cross-sectional view of a portion of the seat support and suspension assembly showing suspension bars in a forward position.

With further reference to FIGS. 1, 2, and 5, the seat suspension assembly 10 includes a rigid base frame 12 securable to a support structure 14. Support structure 14 may be the deck of a watercraft or floor of a land vehicle. The frame 12 includes a pair of generally L-shaped members including spaced bottom members 16 including openings 18 therein to receive fasteners 20 for securing the frame 12 to the support structure 14. Extending upwardly from one end of the bottom members at a generally orthogonal orientation are back members 22. The uppermost portions of the back members 22 are joined to each other by a rigid cross member 24 extending therebetween. The base frame 12 remains stationary when secured to the support structure 14. The base frame 12 may be formed of tubular aluminum, steel, or other rigid material.

The seat suspension assembly 10 may include a seat support 30 for holding a passenger seat 32. The seat support may include a pair of rigid generally L-shaped members 34 each having a back support 36 for supporting the seat back 37 and a bottom support 38 for supporting the seat bottom 39. The bottom supports 38 are elongate members rigidly secured together in a spaced arrangement by a bottom cross member 40. The back supports 36 are rigidly secured to each other by a top cross member 42.

Figure 3:
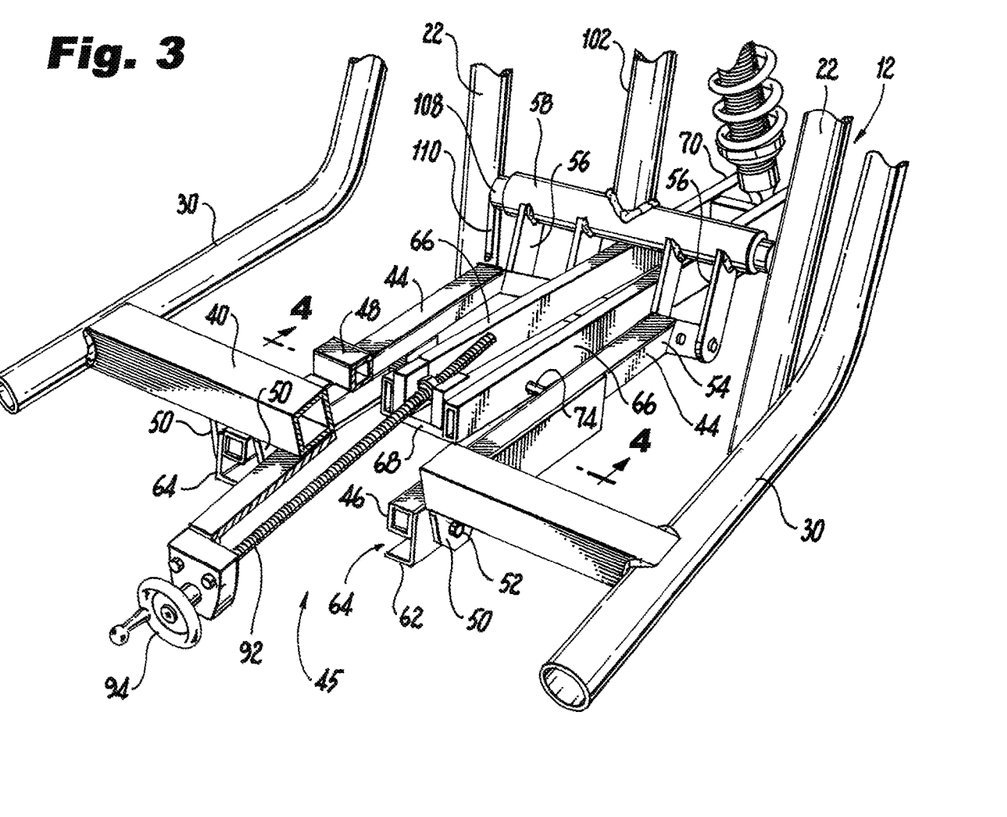
FIG. 3 is a partial perspective view of seat support and suspension assembly.
Figure 4:
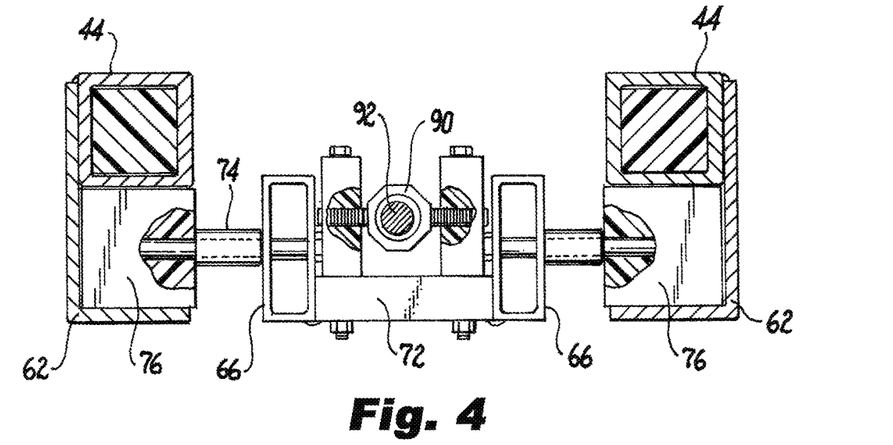
FIG. 4 is a cross-sectional view taken through line 4-4 of FIG. 3.

With reference to FIGS. 3-5, a seat suspension 45 is disposed between the seat support 30 and the frame 12. The seat suspension 45 permits controlled movement of the seat support relative to the frame and assists in isolating the seat occupant from the shocks and impacts imparted to the vehicle or craft.

The seat suspension 45 includes a pair of spaced support rails 44 which support the bottom cross member 40 of the seat support 30. Support rails front ends 46 are each secured to a bottom cross member 40 by spaced flanges 50 and a fastener 52 extending therethrough. A cross member 48 extends between, and is secured to, the two support rails 44. The support rails back ends 54 are each positioned between a pair of spaced brackets 56 extending downwardly from a crossbar 58. The crossbar 58 is movably supported between the frame members. A rod 60 extends through the pair of spaced brackets 56 and the support rails, thereby pivotally securing the support rails to the crossbar 58.

Each support rail 44 includes an L-shaped channel 62 extending downwardly therefrom and extending along its length. The channel 62 defines an open slot 64 extending along a side of the rail. The two rail slots 64 face each other in opposed spaced relation and form a track.

With reference to FIG. 4, the seat suspension 45 further includes a pair of spaced rigid suspension bars 66. The suspension bars 66 are rigid elongate members having a proximal 68 and distal 70 ends. The proximal ends 68 are disposed toward the front of the seat assembly 10 and are joined together in spaced relation by a bracket 72. Offset from the proximal ends 68 is a pair of pins 74 extending outwardly toward and into the channels 62. The pins extend into a guide block 76 which is configured to slide along the length of the track created by channel 62. The guide blocks 76 may be made of nylon or other friction reducing bearing material as is known in the art. The cooperation between the channels 62 and guide blocks 76 allows the suspension bars 66 to translate forward and rearward with respect to the support rails 44.

Figure 6:
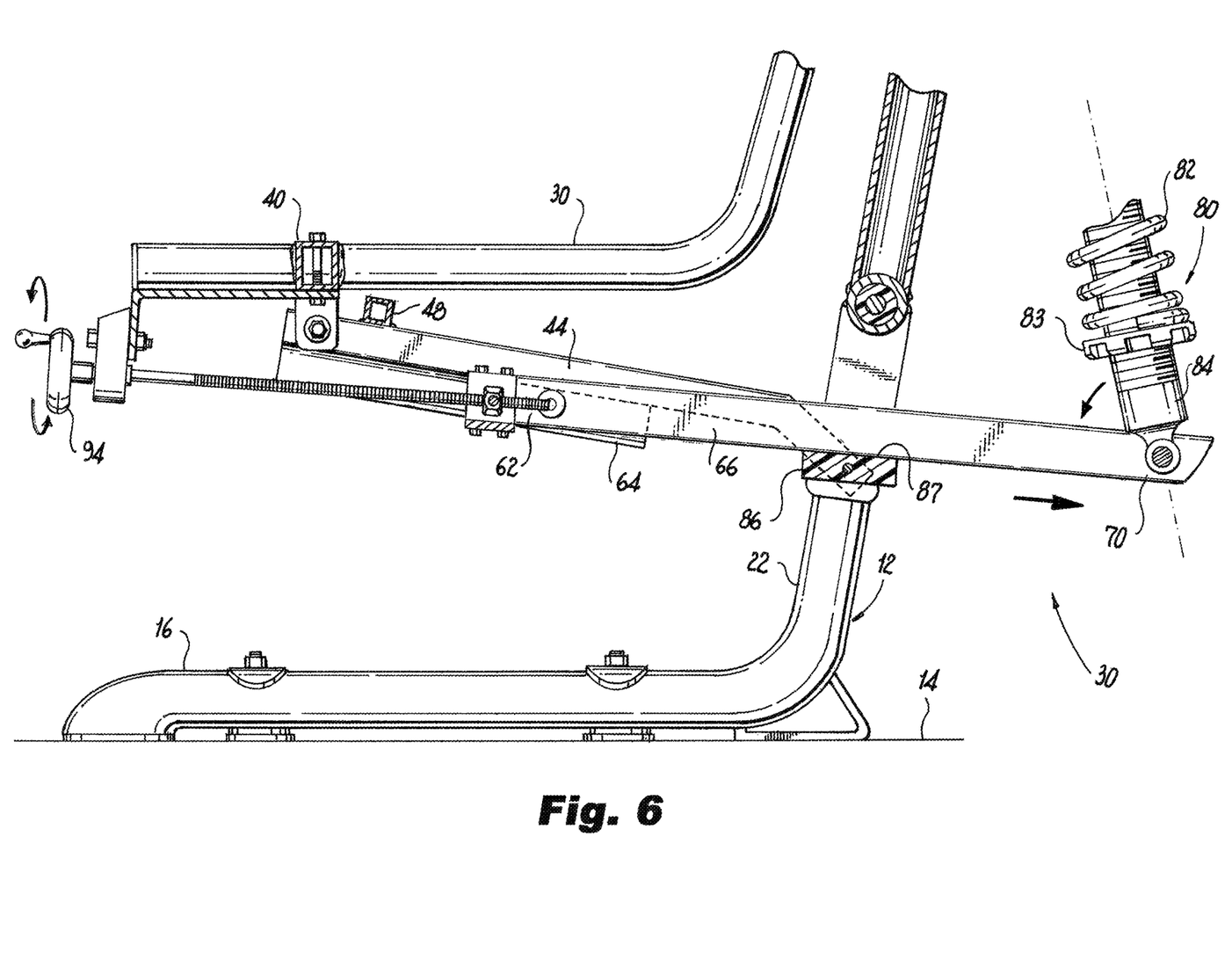
FIG. 6 is a side cross-sectional view of a portion of the seat support and suspension assembly is a seat suspension assembly showing the suspension bars in a rearward position.

With reference to FIGS. 5 and 6, the suspension bars distal ends 70 are pivotally secured to a lower end of a shock compensating device 80. The shock compensating device 80 may include a biasing device 82, such as a coil spring, and a shock dampener 84 to absorb and dampen shock impulses. The connection between the shock compensating device 80 and the suspension bars 66 may permit the shock compensating device 80 to pivot relatives to the suspension bars 66. The shock dampener 84 may have a threaded body 81 and an adjustment ring 83 may be threaded on the body 81 and engagement with one end of the biasing device 82. Movement of the adjustment ring 83 up and down along the threaded body 81 results in compression or decompression of the biasing device to adjust the biasing device's characteristics.

The suspension bars 66 are supported by a pivot block 86. The pivot block 86 is pivotally secured between two spaced flanges 56 extending downwardly from cross bar 58. Rod 60 extends through the width of the pivot block 86. The pivot block 86 includes a planar support surface 87 on which the suspension bars 66 may slide and pivot. The pivot block 86 functions as a fulcrum for the pivoting suspension bars 66. The pivot block 86 may be formed of a nylon material or other material which helps facilitate a sliding motion. Therefore, the pivot block 86 provides support to the suspension bars 66 and permits them to pivot.

With reference to FIGS. 5 and 6, the suspension bars 66 are movable such that the distance between the pins 74 and their guide blocks which ride in the channels move closer to or further away from the pivot block 86. When the suspension bars 66 are moved forwardly, as shown in FIG. 5, more length of the suspension bars hang over the front of the pivot block 86, thereby increasing the torque that can exerted by the occupant in the seat on the shock compensating device 80. This increase in the force exertable on the biasing device 82 and damper 84 tends to create a softer ride with greater seat displacement relative to the support surface 14.

When the pins 74 and their guide blocks 76 are moved closer to the pivot block 86, as shown in FIG. 6, less torque is exerted by the occupant in the seat on the shock compensating device 80. This tends to lead to a stiffer ride with less seat movement relative to the support surface 14.

A seat occupant may move the suspension bars 66 to change the shock compensation properties of the suspension assembly with an adjustment mechanism 89. In one embodiment, the adjustment mechanism may include a guide nut 90 supported with the bracket 72 connecting the suspension bars 66. The adjustment mechanism may also include a lead screw 92 extending through the guide nut 90. The lead screw 92 may be attached to an actuator 94 which is fixedly secured via a bracket to the frame 12. The actuator 94 is disposed toward the front of the seat so it can be accessed by the seat occupant while in the seated position. Rotation of the actuator 94 causes the suspension bars 66 to move guided by the channels 62. Movement of the suspension bars 66 over the pivot block 86 effectively changes the distance between the suspension bar pins 74, which engage the support rails 44 secured to the seat support 30, and pivot block 86. Alternatively, it is further contemplated that other linear adjusting devices known in the art could be used to translate the suspension bars 66.

As a craft is moving and experiences a shock caused by a wave or land form, the seat 32 will move up toward the occupant. When the weight of an occupant is exerted on the seat due to the shock, the resulting force is transferred from the support rails 44 to the suspension bars 66 though the guide pins 74. The suspension bars 66 pivot as forces are applied. The force is then transferred to the end of the shock compensating device 80. As noted above, by turning the actuator 94, the distance that the suspension bars 66 extend beyond the pivot block 86 is changed. By changing the distance that the suspension bars 66 extend beyond the pivot block 86, the effects of the force transmitted to the seat can be varied. The movement characteristics, such as the about of movement, of the seat support 30 and seat 32 thereon are also affected.

For example, when the suspension bars 66 are moved forwardly to a position such that there is maximum amount of extending beyond the pivot block 86, a maximum force can be applied to the shock compensating device 80. In contrast, when the suspension bars 66 are moved rearwardly such that there is a minimum amount of suspension bar overhanging the pivot block 86, the less amount of force is applied by the weight of the occupant.

In operation, when the suspension bars 66 are moved such that there is an increased amount extending beyond the pivot block 86, there is more travel created during impacts imparted to the system. Therefore, with greater travel there is more dampening opportunity and the ride is felt by a user as being soft. When the suspension bars 66 are moved rearwardly such that there is less overhang of the pivot block 86, the ride is stiffened as there is less movement accommodated by the system 10. Accordingly, the shock compensation characteristics may be selected by the seat occupant in order to have the maximum comfort for the particular conditions.

As noted above and with reference to FIG. 7, the suspension bars distal ends 70 are secured to the lower portion of the shock compensating device 80. The upper portion of the shock absorbing device is secured to a mounting block 100 which is rigidly secured a lower post 102 extending upwardly from the crossbar 58. The top end of the shock compensating device may be pivotally secured to the mounting block 100. When the suspension rails 66 are moved linearly, the ability of the shock compensating device to pivot at both ends allows for such linear movement.

Figure 7:
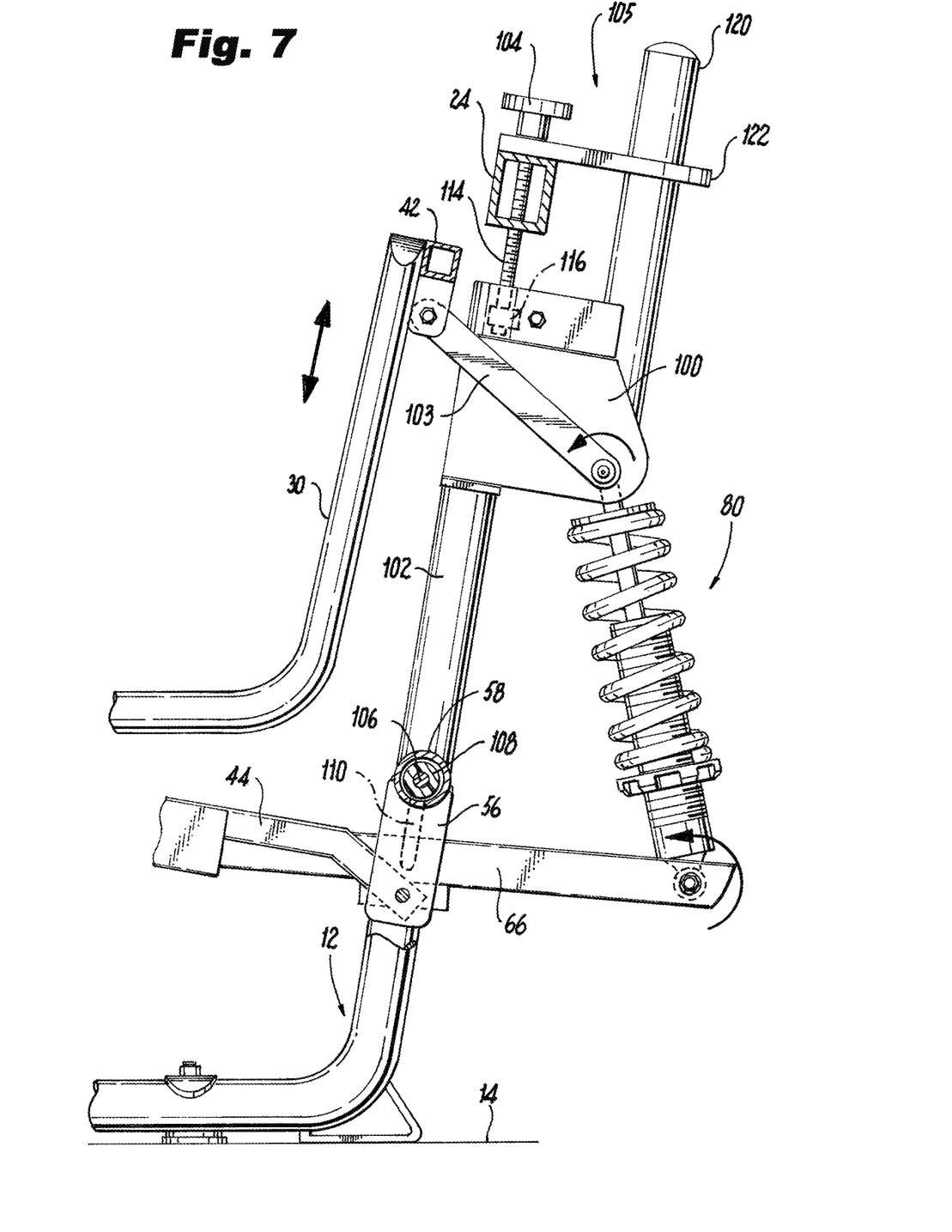
FIG. 7 is a side cross-sectional view of a portion of the seat support and suspension assembly showing a height adjustment mechanism.

A pair of linkages 103 may secure the seat support top cross member 42 to the mounting block 100. One of the pair of linkages 103 may be disposed on each side of the mounting block 100. The linkages 103 are pivotally secured at each end in order to allow the seat support 30 and seat thereon to move relative to the base frame 12.

With reference to FIGS. 3 and 7, the seat suspension assembly 10 further includes a height adjustment mechanism 105 to adjust the height of the seat 32 while maintaining the shock compensation feature. The height adjustment mechanism 105 includes a height actuator 104 which upon activation causes the seat suspension 45 and seat support 30 to both translate up and down relative to the frame 12 and support surface 14. The crossbar 58, to which the support rails 44 are secured, includes at both of its ends a pin 106 and a guide disk 108. The guide disks 108 may be formed of nylon or other non-metallic material and disposed between the body of the crossbar and base uprights in order to permit for smooth motion. The height adjustment mechanism 105 may further include opposed slots 110 formed in the base uprights which extend generally in the vertical direction. The pins 106 extend within the slots to permit guided movement of the crossbar 58. An upper post 120 may be secured at its lower end to the mounting block 100 adjacent the top end of the shock compensating device 80. The upper post extends through a guide plate 122 secured to the frame top cross member 24. As the seat height is adjusted the movement is guided by the interaction of the upper post 120 and guide plate 122.

A height actuator 104 may be rotatably secured to the base frame top cross member 24 and secured to a lead screw 114. The mounting block 100 may include a nut 116 secured therein which receives the lead screw 114. When the height adjustment actuator 104 is rotated, the seat support 30 and the cross member 58 move upwardly. This causes the support rails 44 to also move upwardly along with the suspension bars 66 in order to adjust the height of the seat. Accordingly, the entire seat support 30 and suspension assembly 45 may be raised and lowered by actuation of the height adjustment actuator 104. Therefore, the adjustment of the seat height does not change the shock compensating characteristics of the suspension seat assembly 10.

It is within the contemplation of the present disclosure that the height actuator 104 could include a motorized mechanism to permit the seat occupant to adjust the height by way of a switch in a manner known in the art to a position to provide the desired comfort.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A seat suspension comprising:
a frame fixedly securable to a structure;
a suspension assembly operably connected to the frame;
a seat support adapted to receive a seat, the seat support being operably connected to the suspension assembly,
the suspension assembly including a first elongate suspension bar slidably disposed on a first pivot surface, the first suspension bar having a first end slidingly secured to the seat support and a second opposed end secured to a shock compensating device, the suspension bar being translatable relative to the first pivot surface, wherein moving the suspension bar changes the shock compensation of the suspension assembly, and wherein the suspension assembly includes a second suspension bar spaced from the first suspension bar and being slidably disposed on a second pivot surface, the second suspension bar having a first end slidingly secured to the seat support and a second opposed end secured to the shock compensating device.

2. The seat suspension as defined in claim 1, wherein the suspension assembly includes a pair of spaced rails each having a first end pivotally secured to the seat support and each having a second end pivotally secured to a cross bar connected to the frame.

3. The seat suspension as defined in claim 2, wherein each of the pair of rails include a channel having an open face, and the first and second suspension bars each include a guide member each disposed in one of the channels, the guide members being translatable within the channels.

4. The seat suspension as defined in claim 1, wherein the suspension assembly includes an actuator operably connected to the first and second suspension bars, the actuator being operably to move the suspension bars relative to the seat support.

5. The seat suspension as defined in claim 4, wherein the actuator is disposed at a front end of the seat support and the seat support includes a seat secured thereon, and the actuator is accessible by a seat occupant while seated in the seat.

6. The seat suspension as defined in claim 3, wherein the first and second suspension bars have a first position wherein each of the guide members are spaced a first distance from the the first and second pivot surfaces and a second position wherein each of the guide members are spaced a second distance from the first and second pivot surfaces, wherein the first distance is greater than the second distance.

7. The seat suspension as defined in claim 1, further including a height adjustment mechanism having a height adjustment actuator wherein the height adjustment actuator moves the seat support and the suspension assembly relative to the frame.

8. The seat suspension as defined in claim 7, wherein the first and second pivot surfaces are secured to a cross bar, and the frame has a pair of spaced slots and the cross bar translates in the spaced slots upon activation of the height adjustment actuator.

9. The seat suspension as defined in claim 1, wherein the shock compensating device includes a spring.

10. The seat suspension as defined in claim 9, wherein the shock compensating device includes a shock dampener.

11. The seat suspension as defined in claim 1, wherein the shock compensating device is disposed behind the frame.

12. A seat suspension comprising:
a frame fixedly securable to a structure, the frame including a back portion and a bottom portion, the bottom portion being securable to a support surface;
a suspension assembly operably connected to the frame, the suspension assembly being adjustable to change a shock compensation of the suspension assembly;
a seat support adapted to receive a seat, the seat support being operably connected to the suspension assembly, movement characteristics of the seat support being responsive to an adjustment of the suspension assembly; and
a height adjustment mechanism disposed on the frame, the height adjustment mechanism including an actuator wherein operation of the actuator selectively moves the seat support and the suspension assembly up and down relative to the frame, and wherein, the suspension assembly includes a first elongate suspension bar slidably disposed on a pivot surface, the first suspension bar having a first end slidingly secured to the seat support and a second opposed end secured to a shock compensating device, the suspension bar being translatable relative to the pivot surface, wherein moving the suspension bar changes the shock compensation of the suspension assembly.

13. The seat suspension as defined in claim 12, wherein the suspension assembly includes a shock compensating device including a biasing device and dampening device.

14. The seat suspension as defined in claim 12, wherein the height adjustment mechanism is connected between the frame and a mounting block, the mounting block being connected to the seat support and the suspension assembly.

15. The seat suspension as defined in claim 12, wherein the frame includes a pair of spaced members each having a slot therein, wherein a portion of the suspension assembly being slidably disposed in the slots to permit height adjustment of the suspension assembly and the seat support.

16. The seat suspension as defined in claim 12, wherein the suspension assembly includes a pair of spaced rails each having a first end pivotally secured to the seat support and each having a second end pivotally secured to a cross bar connected to the frame.

17. The seat suspension as defined in claim 16, wherein each of the pair of rails include a channel having an open face, and the first and second suspension bars each include a guide member each disposed in one of the channels, the guide members being translatable within the channels.

18. The seat suspension as defined in claim 16, wherein the suspension assembly includes an actuator operably connected to the pair of rails, the actuator being operable to move the pairs of rails relative to the support surface.

19. The seat suspension as defined in claim 1, wherein the first and second pivot surfaces are disposed on a singular pivot block.

20. A seat suspension comprising:
a frame fixedly securable to a structure;
a suspension assembly operably connected to the frame;
a seat support adapted to receive a seat, the seat support being operably connected to the suspension assembly,
the suspension assembly including a first elongate suspension bar slidably disposed on a pivot surface, the first suspension bar having a first end slidingly secured to the seat support and a second opposed end secured to a shock compensating device, the suspension bar being translatable relative to the pivot surface, wherein moving the suspension bar changes the shock compensation of the suspension assembly; and a height adjustment mechanism having a height adjustment actuator wherein the height adjustment actuator moves the seat support and the suspension assembly relative to the frame.

* * * * *